Patented Sept. 24, 1940

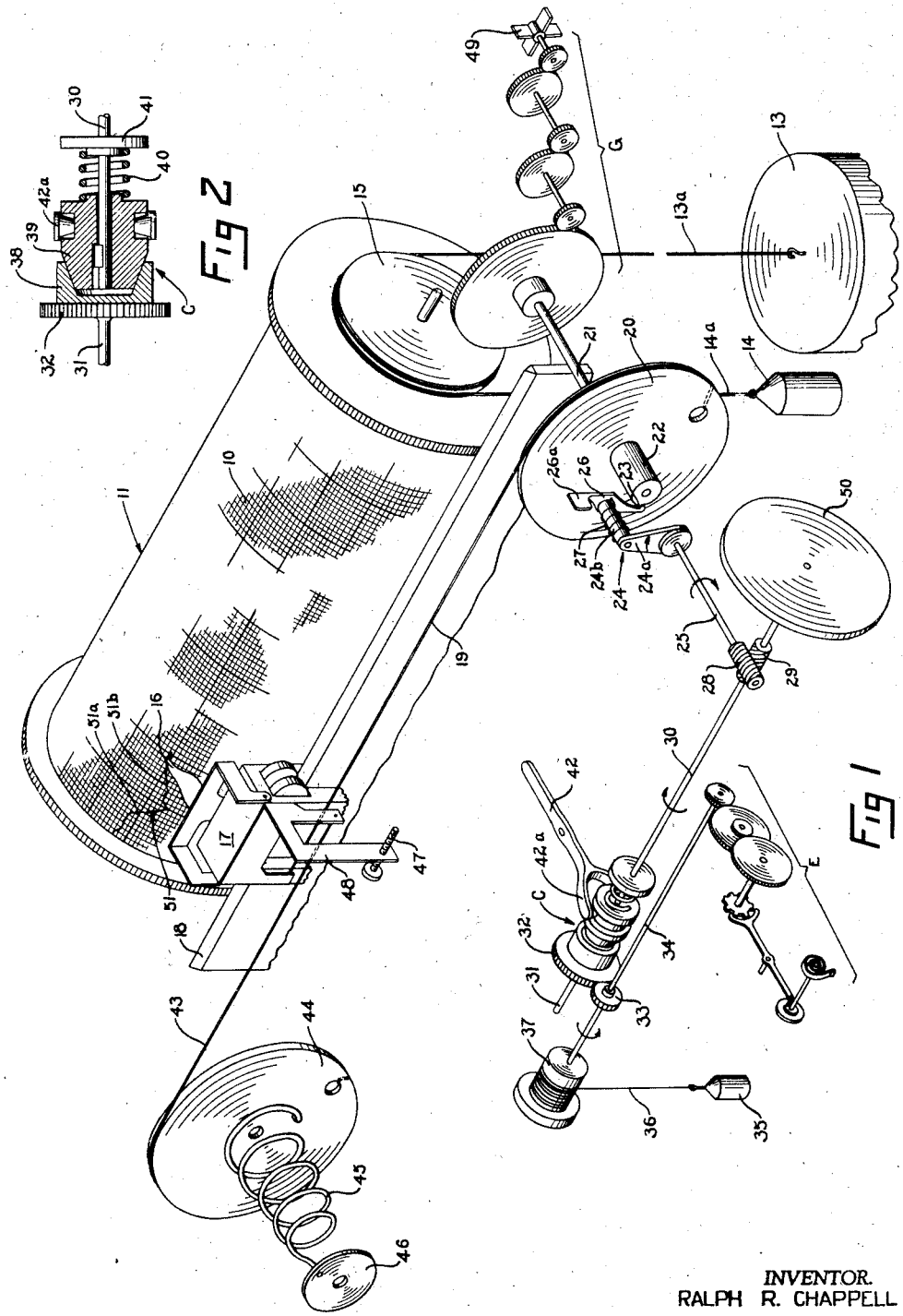

2,215,542

UNITED STATES PATENT OFFICE 2,215,542

MULTIPLE TRAVERSE RECORDER

Ralph R. Chappell, Richmond, Va., and Rutger B. Colt, Baltimore, Md., assignors to Bendix Aviation Corporation, South Bend, Ind., a corporation of Delaware Application February 18, 1937, Serial No. 126,482

3 Claims. (Cl. 234—71)

This invention relates to motion transmitting mechanism and more particularly to means for controlling the reciprocating movement of a member, such as a stylus in recording mechanism adapted to record a variable quantity, such as a variable force movement or condition, against time.

One of the objects of the present invention is to provide novel recording apparatus whereby a readily readable record of a variable quantity recorded against time as rectangular coordinants may be produced.

Another object is to provide novel apparatus wherein an element is adapted to be moved in one direction from a reference position at a controlled rate and automatically returned without material delay to said reference position after a predetermined movement or time interval.

Still another object is to provide novel means whereby a graphic record of the values of a variable quantity recorded against time during an unlimited period may be produced on a comparatively small recording sheet or chart.

A further object is to provide a novel mechanism which is capable of tracing a record of a variable quantity against time as rectangular coordinants in the first quadrant where a rising ordinate is always indicative of an increasing value of the variable and a falling ordinate always indicates a decrease in the variable quantity.

Another object is to provide novel recording mechanism and control means therefor whereby a variable having a substantially unlimited range of values may be recorded for a substantially unlimited period of time on a chart of limited dimensions.

A still further object is to provide novel means whereby an element, such as a recording stylus, may be automatically reciprocated in a predetermined manner.

The above and further objects and novel features of the invention will more fully appear from the following detailed description, when the same is read in connection with the accompanying drawing. It is to be expressly understood, however, that the drawing is designed for the purpose of illustration only and is not intended as a definition of the limits of the invention, reference being primarily had for this latter purpose to the appended claims.

In the drawing, wherein like reference characters refer to like parts throughout the several views, Fig. 1 is a diagrammatic, isometric view, with parts broken away, of a water-stage recorder embodying one form of the present invention; and, Fig. 2 is an enlarged detail view, partly in section, of one form of clutch mechanism which may be employed in carrying out the invention.

A single embodiment of the invention is illustrated in the drawing, by way of example only, in the form of a water-stage recorder, wherein the movement of a record sheet is controlled by a float in accordance with the changing level of the water in a river, lake, reservoir, or the like, and wherein a stylus is moved across the sheet in engagement therewith by constant speed driving means to thereby produce a graphic record of the water level plotted against time. In the embodiment shown, a recording sheet 10, preferably of cross section paper, is mounted on a cylindrical drum 11 which is adapted to be rotated in one direction by the falling motion of a float 13 when the surface of a body of liquid, on which the float rests, is falling, and in the other direction by the falling motion of a counter-weight 14 when float 13 is lifted by a rising liquid level, said counter-weight being of insufficient weight to lift the float. Said float and counter-weight may be operatively connected to drum 11 through the medium of flexible cables 13a, 14a and a grooved hub portion 15 secured to one end of the drum. The latter will thus be rotated under the control of float 13 in accordance with the changing values of a variable quantity to be recorded, which quantity, in the present instance, is a liquid level, said drum being rotated in a clockwise direction, as viewed in the drawing, for a falling level, and in a counter-clockwise direction for a rising level.

For the purpose of producing a record curve on sheet 10 which is indicative of the position of the water level or indicative of the value of some other variable quantity in accordance with which drum 11 is rotated, a stylus 16 is provided. Said stylu is adapted to engage sheet 10 and is mounted on a carriage 17 which is, in turn, supported on a track 18 for reciprocating movement in a line parallel to the axis of drum 11. Thus, when carriage 17 is moved at a constant speed across chart 10, a record in rectangular coordinates will be produced with time as one coordinate and the value of the variable, i. e., the liquid level, as the other coordinate.

Recording mechanisms of the general type above referred to have been heretofore provided but, insofar as applicant is aware, common means have been emplyed in prior devices for moving the stylus in both directions across the record sheet either at a constant speed or in accordance with the values of a variable, thereby resulting in the production of a record curve, the slope of which is not indicative of the manner in which the variable is changing. Novel means which are simple both in construction and operation are accordingly provided by the present invention for controlling the movement of stylus 16 back and forth across chart 10, whereby the slope of the record curve produced on said chart will always be positive for indicating a rising level or increasing variable and always negative for indicating a falling level or a decreasing variable, or vice versa, said novel means comprising reenergizable means for moving carriage 17 and, hence, stylus 16 to the right, as viewed in the drawing, at a constant speed, i. e., through a predetermined distance per unit of time, control means for automatically disconnecting the carriage from said reenergizable means, and means for then promptly returning the carriage and stylus to the left-hand edge of chart 10.

In the illustrated embodiment, the reenergizable, constant speed driving means for moving carriage 17 includes a flexible cable or chain 19 connecting said carriage to a pulley 20, the circumference of which is equal to the linear distance through which it is desired to move stylus 16. Pulley 20 is rotatable about an axis 21 extending at right angles to the line of movement of carriage 17 and is provided with a hub portion 22 which is cylindrical except for a lug or sear 23 thereon that is shown as having one surface extending radially of the hub and one surface extending tangentially thereof. A crank 24, comprising a radial portion 24a and an axial portion or handle 24b, is secured to one end of a rotatable shaft 25 which is coaxial with the axis of rotation of pulley 20. A trigger or latch 26 is loosely mounted on the outer end of crank portion 24b and overhangs hub 22 and one end of said latch or pawl is formed as a catch or hook adapted to engage the flat radial surface of sear 23, a coil spring 27 being provided for yieldingly maintaining said pawl in position to operatively engage said sear whereby, when shaft 25 and crank 24 are rotated in the direction indicated by the arrows, pulley 20 will be rotated in a clockwise direction and, hence, move carriage 17 toward the right along track 18. Shaft 25 has secured thereon a spiral gear 28 that is in constant mesh with a similar gear 29 on a rotatably mounted shaft 30 which may be disengageably connected to a shaft 31 by means of a friction clutch C to be hereinafter fully described. A gear 32 on the latter shaft meshes with a gear 33 on a shaft 34 which is adapted to be rotated by any suitable means, such as weight 35, the latter being suspended on a cable 36 that is wound around and fastened to a drum 37 which is mounted on said shaft 34. Means are provided for controlling the movement of shaft 34 so that the same will be rotated by weight 35 at a constant or time controlled speed, said means, in the form shown, being constituted by a clock escapement mechanism E of any suitable or well-known construction.

Clutch C may also be of any suitable or well-known construction, the same, in the form shown (Fig. 2), comprising a recessed or female portion 38 mounted for rotation with shaft 31 and a cone-shaped male portion 39 keyed or otherwise secured to shaft 30 for rotary movement therewith and axial movement relative thereto. Resilient means, such as a coil spring 40, are interposed between male clutch part 39 and a collar 41 on shaft 30 to normally yieldingly hold said part in frictional engagement with female part 38. A pivoted lever 42, having a bifurcated portion 42a which carries rollers adapted to engage a peripheral groove in member 39, is provided for moving said member axially of shaft 30 and out of engagement with member 38 to thereby disconnect shafts 30 and 31.

For the purpose of moving carriage 17 and stylus 16 in the reverse direction, i. e., toward the left as viewed in the drawing, said carriage is connected, by means of a flexible cable or chain 43, to a rotatably mounted pulley 44. The means for rotating the latter in a counter-clockwise direction to return carriage 17 to its reference position is constituted by a coil spring 45 one end of which is secured to pulley 44 and the other end of which is anchored to a fixed member, such as plate 46. It will thus be seen that spring 45 is adapted to be wound or energized each time the carriage is moved from left to right by clock weight 35, sufficient energy being stored therein to return the carriage to its reference position.

Novel means are provided to effect an automatic disconnection of pulley 20 from the driving means therefor and, hence, to release carriage 17 for movement by spring 45 and pulley 44 when stylus 16 reaches the right-hand edge of chart 10, said means, in the illustrated embodiment, including a tripping pin 47 which is adjustably mounted in an arm 48 secured to or formed integrally with carriage 17 and depending below chain or cable 19. Pin 47 is so positioned as to engage an outwardly extending, enlarged portion 26a of latch 26 when stylus 16 approaches the right-hand edge of sheet 10 or reaches some other predetermined point.

It will be noted that pulley 20 and latch 26 rotate at equal angular velocities with coaxial shafts 21 and 25 as centers, but that the outer end of said latch moves in a smaller circle than does a point on the periphery of the pulley. The outer end of said latch accordingly moves with a lower linear velocity than does said point. Carriage 17 and pin 47, however, move with the same linear velocity as said point on the periphery of pulley 20 and, hence, at a greater linear speed than portion 26a of latch 26. Thus, after pin 47 engages latch portion 26a, the former, upon continued movement of carriage 17 to the right, moves faster than said latch portion and becomes effective to swing latch 26 in a clockwise direction about crank handle 24b until the inner hooked end of the latch disengages sear 23. Carriage 17 is thereby released for return movement under the influence of spring 45 until pulley 20 has made one complete revolution and gear 23 again engages the hook portion of latch 26, the latter being held in engagement with hub 22, and hence in position for engaging said sear, by spring 27. The point at which latch 26 is caused to disengage sear 23 may be adjusted by adjusting the position of pin 47, thereby determining the position of stylus 16 relative to chart 10 when the reversal of movement takes place.

The return or reverse movement of carriage 17 and pen 16 is preferably yieldingly resisted in order to prevent too rapid movement thereof and avoid any jarring or unnecessary strain on the parts. Damping means are employed in the illustrated embodiment for offering said resistance, said means being constituted by a vane fan 49 which is connected through a train of reduction gears G to shaft 21 on which pulley 20 is mounted.

Chart 10 is preferably graduated in a direction axially of drum 11 in units of time and, in order that pen 16 may be readily set on any desired time ordinate, a manually operable knob or wheel 50 is provided on shaft 30. By disengaging clutch C and turning wheel 50, the recording stylus may be moved into line with any desired time ordinate on sheet 10.

In operation, the falling of weight 35 is effective to rotate shaft 34 under the control of escapement mechanism E at a constant angular velocity. The motion of shaft 34 is transmitted through gear 33, 32, clutch C, spiral gears 29, 28, crank 24 and latch 26 to pulley 20. The direction of rotation of the latter is such as to wind cable 19 onto the periphery thereof and, hence, pull carriage 17 and stylus 16 toward the right at a constant, predetermined speed. During the movement of stylus 16 to the right, the same traces a record curve 51 on chart 10, the form of which will depend upon the movements of drum 11 which, in turn, depend upon the changing level of the liquid on which float 13 rests, as has been heretofore fully pointed out. The portion of curve 51 having a negative slope, such as portion 51a, indicates a falling level, whereas a rising portion, such as portion 51b, indicates a rising level.

As stylus 16 approaches the right-hand edge of sheet 10, pin 47 engages and trips latch 26, 26a, whereupon spring 45 and pulley 44 become effective to promptly return the carriage and stylus to the left-hand edge of the sheet under the control of damping fan 49. Sear 23 engages latch 26 again after one revolution of pulley 20, thereby stopping the carriage and reestablishing the driving connection between said pulley and weight 35, and the cycle is repeated. Although some time is consumed in returning stylus 16 to its reference position at the left-hand edge of sheet 10, this time is small and negligible for all practical purposes. If the mechanism were moved at a constant speed and permitted to record during the movement of carriage 17 to the left, as is the common practice, it will be seen that a negative slope of the curve produced during this return movement would represent a rising liquid level and a positive slope would indicate a falling liquid level. With applicant's novel device, however, a positive slope in any portion of the record curve always indicates a rising liquid level and a negative slope always indicates a falling liquid level level. In other words, the curve may always be considered as a curve of rectangular coordinates in the first quadrant. It will be seen that the prime mover for moving carriage 17 to the right, i. e., weight 35 in the embodiment shown, may be repeatedly reenergized and that drum 11 and chart 10 may make any number of revolutions for either an increasing or decreasing value of the variable being recorded, thereby making it possible to record a variable having a substantially unlimited range of values during a substantially unlimited period of time on a chart of limited dimensions.

There is thus provided a novel motion transmitting and control mechanism which is particularly adapted for use in recording mechanism adapted to record a variable quantity against time as rectangular coordinates whereby the curve produced is always in the first quadrant, like slopes in all parts of the curve representing like changes in the value of the recorded variable. A novel recording instrument is also provided whereby a variable quantity having a substantially unlimited range of values may be recorded during a substantially unlimited period of time on a relatively small chart. The mechanism provided is simple both in construction and operation and may be readily and inexpensively manufactured.

Although only a single embodiment of the invention has been illustrated and described in detail, it is to be expressly understood that the same is not limited thereto but that various changes may be made therein without departing from the spirit and scope of the invention, such as in the design and arrangement of parts illustrated, as will now be apparent to those skilled in the art. For a definition of the limits of the invention, reference will be had primarily to the appended claims.

What is claimed is:

1. In a recorder for recording a variable quantity, the combination of a rotatable drum having a record sheet thereon, means responsive to variations in said quantity for rotating said drum to move said sheet in accordance with said variations, a track adjacent said drum and extending parallel to the axis of rotation of said drum, a carriage movable on said track in opposite directions, a stylus mounted on said carriage and movable therewith to produce a record on said sheet, time-controlled driving means, means including a releasable connection for drivably connecting said carriage and said driving means to move said carriage and stylus along said track relatively slowly in one direction a predetermined distance from a reference point in a predetermined length of time, means on said carriage for operating said releasable connection when said carriage has reached the end of said predetermined distance to thereby release said carriage for rapid return movement in the opposite direction, and means effective upon release of said carriage for rapidly moving said carriage and stylus in said opposite direction to return them immediately to said reference point.

2. In a recorder for recording a variable quantity, the combination of a rotatable drum having a record sheet thereon, means responsive to variations in said quantity for rotating said drum to move said sheet in accordance with said variations, a track adjacent said drum and extending parallel to the axis of rotation of said drum, a carriage movable on said track in opposite directions, a stylus mounted on said carriage and movable therewith to produce a record on said sheet, time-controlled driving means, means including a releasable connection for drivably connecting said carriage and said driving means to move said carriage and stylus along said track relatively slowly in one direction a predetermined distance from a reference point in a predetermined length of time, means on said carriage for operating said releasable connection when said carriage has reached the end of said predetermined distance to thereby release said carriage for rapid return movement in the opposite direction, and means energizable by said time-controlled driving means and effective upon release of said carriage for rapidly moving said carriage and stylus in said opposite direction to return them immediately to said reference point.

3. In a water-stage recorder, the combination of a rotatable drum having a record sheet attached thereto and rotatable therewith, means including a float actuated in response to changes in water-stage for rotating said drum and record sheet in accordance with said changes, a track adjacent said drum and extending parallel to the axis of rotation of said drum, a carriage movable on said track in opposite directions, a recording pen mounted on said carriage and engaging said record sheet to produce a record thereon, chronometric driving means, means for drivably connecting said carriage and said driving means to move said carriage and recording pen along said track relatively slowly in one direction a predetermined distance from a reference point in a predetermined length of time, said connecting means including a belt and a pair of pulleys connected thereto at each end thereof and releasable connecting means interposed between one of said pulleys and the chronometric driving means, means movable with said carriage for actuating said releasable connecting means when said carriage has reached the end of said predetermined distance to thereby release said carriage for rapid return movement in the opposite direction, and a spring motor connected to the other of said pulleys and effective upon release of said carriage for rapidly moving said carriage and recording pen to return them immediately to said reference point, said spring motor being wound by said chronometric driving means during the slow movement of the carriage in the one direction.

RALPH R. CHAPPELL.
RUTGER B. COLT.